United States Patent
Hung et al.

(10) Patent No.: US 10,720,052 B2
(45) Date of Patent: Jul. 21, 2020

(54) INTELLIGENT CONTROL CIRCUIT AND CONTROLLER FOR TRAFFIC LED SIGNAL LAMP

(71) Applicant: Hokyuen Hung, Shanghai (CN)

(72) Inventors: Hokyuen Hung, Shanghai (CN); Hokman Hung, Shanghai (CN)

(73) Assignee: Hokyuen Hung, Shanghai (CN)

( * ) Notice: Subject to any disclaimer, the term of this patent is extended or adjusted under 35 U.S.C. 154(b) by 0 days.

(21) Appl. No.: 16/248,360

(22) Filed: Jan. 15, 2019

(65) Prior Publication Data
US 2019/0221114 A1  Jul. 18, 2019

Related U.S. Application Data

(63) Continuation of application No. PCT/CN2018/072882, filed on Jan. 16, 2018.

(30) Foreign Application Priority Data

Nov. 16, 2016 (CN) .................. 2016 2 1255124 U

(51) Int. Cl.
| | |
|---|---|
| G08G 1/07 | (2006.01) |
| H02J 7/35 | (2006.01) |
| H05B 45/37 | (2020.01) |
| H05B 45/50 | (2020.01) |

(52) U.S. Cl.
CPC .............. G08G 1/07 (2013.01); H02J 7/35 (2013.01); H05B 45/37 (2020.01); H05B 45/50 (2020.01)

(58) Field of Classification Search
CPC ...................................................... G08G 1/07
See application file for complete search history.

(56) References Cited

U.S. PATENT DOCUMENTS

| | | | | |
|---|---|---|---|---|
| 5,457,450 A | * | 10/1995 | Deese ................... | G08G 1/095 340/641 |
| 2002/0154031 A1 | * | 10/2002 | Chan ...................... | G08G 1/07 340/907 |
| 2003/0227452 A1 | * | 12/2003 | Hartular ............... | H02J 7/0063 345/211 |

(Continued)

FOREIGN PATENT DOCUMENTS

| | | |
|---|---|---|
| CN | 203661373 | 6/2014 |
| CN | 104219843 | 12/2014 |

(Continued)

OTHER PUBLICATIONS

International Search Report for PCT/CN2018/072882 dated Apr. 18, 2018, 4 pages.

*Primary Examiner* — Nabil H Syed
*Assistant Examiner* — Cal J Eustaquio
(74) *Attorney, Agent, or Firm* — Nixon & Vanderhye PC

(57) ABSTRACT

An intelligent control circuit for a traffic LED signal lamp, including: a driving power, configured to convert an utility electric alternating current into multiple direct currents for output; multiple precise constant current modules, in one-to-one correspondence to the multiple direct currents, respectively, and configured to perform precise constant current processing on each of the multiple direct currents for output; and traffic LED signal lamps, in respective connection with output terminals of multiple precise constant current modules.

20 Claims, 2 Drawing Sheets

(56) References Cited

U.S. PATENT DOCUMENTS

| | | | | |
|---|---|---|---|---|
| 2004/0233145 A1* | 11/2004 | Chiang | ............. | H05B 33/0809 345/82 |
| 2007/0103384 A1* | 5/2007 | Hsieh | ................... | G06F 3/1446 345/1.1 |
| 2013/0019809 A1* | 1/2013 | McCallum | ............... | A01K 7/00 119/75 |

FOREIGN PATENT DOCUMENTS

| | | |
|---|---|---|
| CN | 204029160 | 12/2014 |
| CN | 204795806 | 11/2015 |
| CN | 206237639 | 6/2017 |
| EP | 1 919 261 | 5/2008 |

* cited by examiner

INTELLIGENT CONTROL CIRCUIT AND CONTROLLER FOR TRAFFIC LED SIGNAL LAMP

CROSS-REFERENCE TO RELATED APPLICATIONS

This application is a continuation of International Patent Application No. PCT/CN2018/072882 with an international filing date of Jan. 16, 2018, designating the United States, now pending, and further claims priority benefits to Chinese Patent Application No. 201621255124.5 filed Nov. 16, 2016. The contents of all of the aforementioned applications, including any intervening amendments thereto, are incorporated herein by reference.

TECHNICAL FIELD

The present application relates to the technical field of the traffic signal lamp control, and more particularly to an intelligent control circuit and controller for a traffic LED signal lamp.

BACKGROUND

At present, traffic LED signal lamps are widely used in traffic such as in roads and railways. Main faults of traffic LED signal control include: short circuit of a bidirectional silicon controlled rectifier, open circuit of a bidirectional silicon controlled rectifier, and vulnerability of high voltage alternating current (AC)/direct current (DC) driver provided within the signal lamp. Breakdown resulted short circuit in the high voltage driving of the bidirectional silicon controlled rectifier in the controller is the main reason for the serious faults like the "green conflict" (that is, the phenomenon that the green light is always on), which is originated from inherent defects of the systematic circuit design and the bidirectional silicon controlled rectifier, and is one of the main reasons for the high failure rate of the current traffic signal controller and the signal lamp.

Moreover, due that for each signal lamp, high damage rate (one of the reasons is the cause of the transient high voltage impulsion at frequent switching) of the built-in AC/DC driving power also leads to high failure rate of the signal lamp, thereby affecting the service life of the LED signal lamp.

Technical Problem

The existing traffic LED signal lamps have the following problems: "green conflict" is easily caused, the set of the signal lamps are all off or the red and green lights in the signal lamp set are simultaneously on, and the failure rate is high.

Technical Solution

Embodiments of the present application are realized as follows: an intelligent control circuit for an LED signal lamp is provided. The intelligent control circuit for the traffic LED signal lamp comprises:

a driving power, configured to convert an utility electric alternating current into multiple direct currents for output;

multiple precise constant current modules, in one-to-one correspondence to the multiple direct currents, respectively, and configured to perform precise constant current processing on each of the multiple direct currents for output; and traffic LED signal lamps, in respective connection with output terminals of multiple precise constant current modules.

In the above structure, the intelligent control circuit for the traffic LED signal lamp further comprises:

a CPU processor, in connection with the multiple precise constant current modules, respectively, and configured to output control signals to the multiple precise constant current modules.

In the above structure, the intelligent control circuit for the traffic LED signal lamp further comprises:

a fault detection board, respectively in connection with the CPU processor and with the output terminals of the precise constant current modules, configured to monitor a traffic LED signal light system and to avoid abnormal display of the traffic LED signal light system.

In the above structure, the intelligent control circuit for the traffic LED signal lamp further comprises:

an AC/DC switching module, in connection with the driving module, and configured to: receive a solar electric source and determine whether or not the solar electric source satisfies a preset condition, and convert the solar electric source into the multiple direct currents or alternatively directly connect to the utility electric alternating current according to the preset condition.

In the above structure, the intelligent control circuit for the traffic LED signal lamp further comprises:

an energy storage module, in connection with the AC/DC switching module, configured to be charged by a solar charging power supply or a first rectification power supply, and output the solar electric source.

In the above structure, the intelligent control circuit for the traffic LED signal lamp further comprises:

a solar energy controller module, in connection with the energy storage module, and configured to generate the solar charging power supply according to an original solar electric source.

In the above structure, the intelligent control circuit for the traffic LED signal lamp further comprises:

a first rectifier module, in connection with the energy storage module, and configured to generate the first rectification power supply according to the utility electric alternating current.

In the above structure, the intelligent control circuit for the traffic LED signal lamp further comprises:

a solar energy receiving device, in connection with the solar energy controller module, and configured to convert a received solar energy into the original solar electric source.

In the above structure, the intelligent control circuit for the traffic LED signal lamp further comprises:

a second voltage drop module, in connection with the AC/DC switching module, and configured to generate a second voltage drop power according to the direct current output by the AC/DC switching module;

a first voltage drop module, in connection with the driving power, and configured to generate a first voltage drop power according to the direct current output by the driving power;

a second rectifier module, in connection with the fault detection board, and configured to generate a second rectification power according to the utility electric alternating current;

the CPU processor is in connection with the first voltage drop module, and the CPU processor is supplied with power by the first voltage drop power; and the fault detection board is in connection with the second voltage drop module, and the fault detection board is supplied with power by the second voltage drop power or the second rectification power.

In the above structure, the intelligent control circuit for the traffic LED signal lamp further comprises:

an RS232 interface, an RS485 interface, a JR45 interface, and a USB interface respectively in connection with the CPU processor.

In the above structure, the intelligent control circuit for the traffic LED signal lamp further comprises:

a liquid crystal display and control button module connected to the CPU processor, respectively.

In the above structure, the input alternating current of the driving power is 80-305 V, and the output direct current of the driving power is no higher than 60 V.

In the above structure, the CPU processor uses a CPU chip, a signal terminal of the CPU chip is respectively in connection with the RS232 interface, the RS485 interface, the JR45 interface, and the USB interface, a display controlling signal terminal of the CPU chip is respectively in connection with the liquid crystal display and control button module and the fault detection board, and multiple control terminals ctrl of the CPU chip are respectively in connection with the multiple precise constant current module.

It is another object of the embodiments of the present application to provide an intelligent controller for a traffic LED signal lamp. The intelligent controller for the traffic LED signal lamp comprises the above-described intelligent control circuit for the traffic LED signal lamp.

Advantageous Effect

In embodiments of the present application, the intelligent control circuit for the traffic LED signal lamp comprises, in series connection, the driving power, the multiple precise constant current modules, and the multiple traffic LED signal lamps. Each of the multiple precise constant current modules outputs a low voltage direct current to directly drive the traffic LED signal lamp, rather than adopting the conventional high voltage driving mode by the bidirectional silicon controlled rectifier, such that problems of "green conflict" caused by the breakdown resulted short circuit and open circuit in the high voltage driving of the bidirectional silicon controlled rectifier are eliminated. In addition, the traffic LED signal lamp is no longer provided therein with the high voltage AC/DC driving power, such that the problems of transient high voltage impulsion at frequency switching and open circuit, short circuit, heat, and vulnerability of the AC/DC driving power are avoided. The lamp body can work normally even when being penetrated with water, not only are the work reliability, accuracy, safety, and energy saving performance of the traffic LED single lamp improved, but also the service life of the traffic LED signal lamp and the performance of the backup power supply are greatly improved.

DETAILED DESCRIPTION OF THE EMBODIMENTS

In order to make the purpose, the technical solution, and the advantages of the present application clearer, the present application will be further described in detail combining with the drawings and the embodiments. It should be understood that the specific embodiments described herein are only used to explain, but not to limit, the present application.

Figure 1:
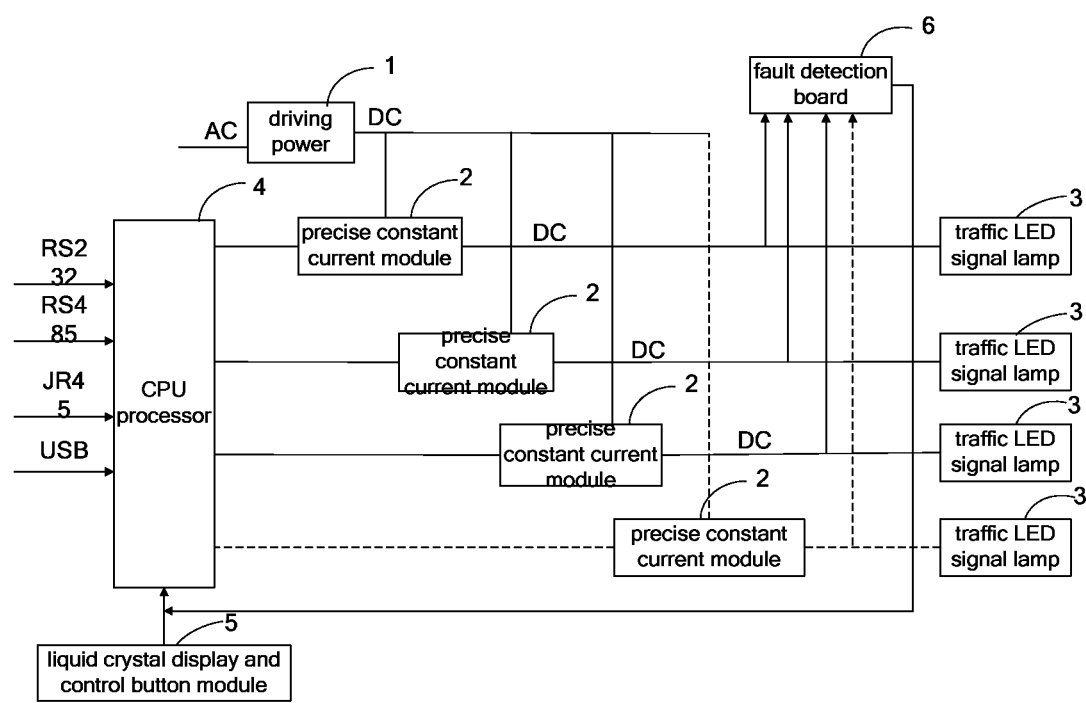
FIG. 1 is a structural diagram of an intelligent control circuit for the traffic LED signal lamp provided by an embodiment of the present application.

FIG. 1 illustrates a structure of an intelligent control circuit for a traffic LED signal lamp provided by an embodiment of the present application, for facilitating the description, only those related to the present embodiment of the application are shown.

A intelligent control circuit for a traffic LED signal lamp is provided. The intelligent control circuit for the traffic LED signal lamp comprises:

a driving power 1, configured to convert an utility electric alternating current into multiple direct currents for output;

precise constant current modules 2, corresponding to the multiple direct currents, respectively, and configured to perform precise constant current processing on each of the multiple direct currents for output; and traffic LED signal lamps 3, in respective connection with output terminals of multiple precise constant current modules.

In order to ensure the long service life and the normal operation of the traffic LED signal lamps 3, the traffic LED signal lamps 3 are no longer provided therein with AC/DC driving powers, but the precise constant current DC is directly used to drive the LED lamps, such that the LED lamp panel has no transient impulsion current at switching, and excludes vulnerability problems, such as the open circuit or short circuit of the high voltage AC/DC driving power, protects the LED lamp bulbs, thereby greatly prolonging the service life of the LED without light decay or dead light and avoiding serious faults.

As an embodiment of the present application, the intelligent control circuit for the traffic LED signal lamp further comprises:

a CPU processor 4, in connection with the multiple precise constant current modules 2, respectively, and configured to output control signals to the multiple precise constant current modules 2.

As an embodiment of the present application, the intelligent control circuit for the traffic LED signal lamp further comprises:

a fault detection board 6, respectively in connection with the CPU processor 4 and the output terminals of the precise constant current modules 2, configured to monitor and control a traffic LED signal light system and to ensure avoiding abnormal display of the traffic LED signal light system.

When the CPU processor 4 fails or has power supplying problems, the fault detection board 6 can work independently, and independently performs the "yellow flickering" processing and transmits the alarm and fault information, via a wireless network (GPRS, CDMA2000, LTE, etc.) or a wired network, to a host computer. The host computer can also remotely control the intelligent control circuit for the traffic LED signal lamp via the wireless network or the wired network. The above wireless network includes a 2G network, a 3G network, and a 4G network.

The purpose of the provision of the fault detection board 6 is as follows: for the display abnormalities and faults resulted from the possible external forces and special reasons, the fault detection board 6 can perform full-time precise monitoring on the signal display system. The fault detection board 6 can instantly trigger the CPU processor 4 to perform the "yellow flickering" processing for serious fault problems caused by controller, human, and other special reasons, such that the traffic LED signal lamp 3 enters a "yellow flickering" state, and traffic accidents caused by the abnormal display of the signal system are avoided.

Figure 2:
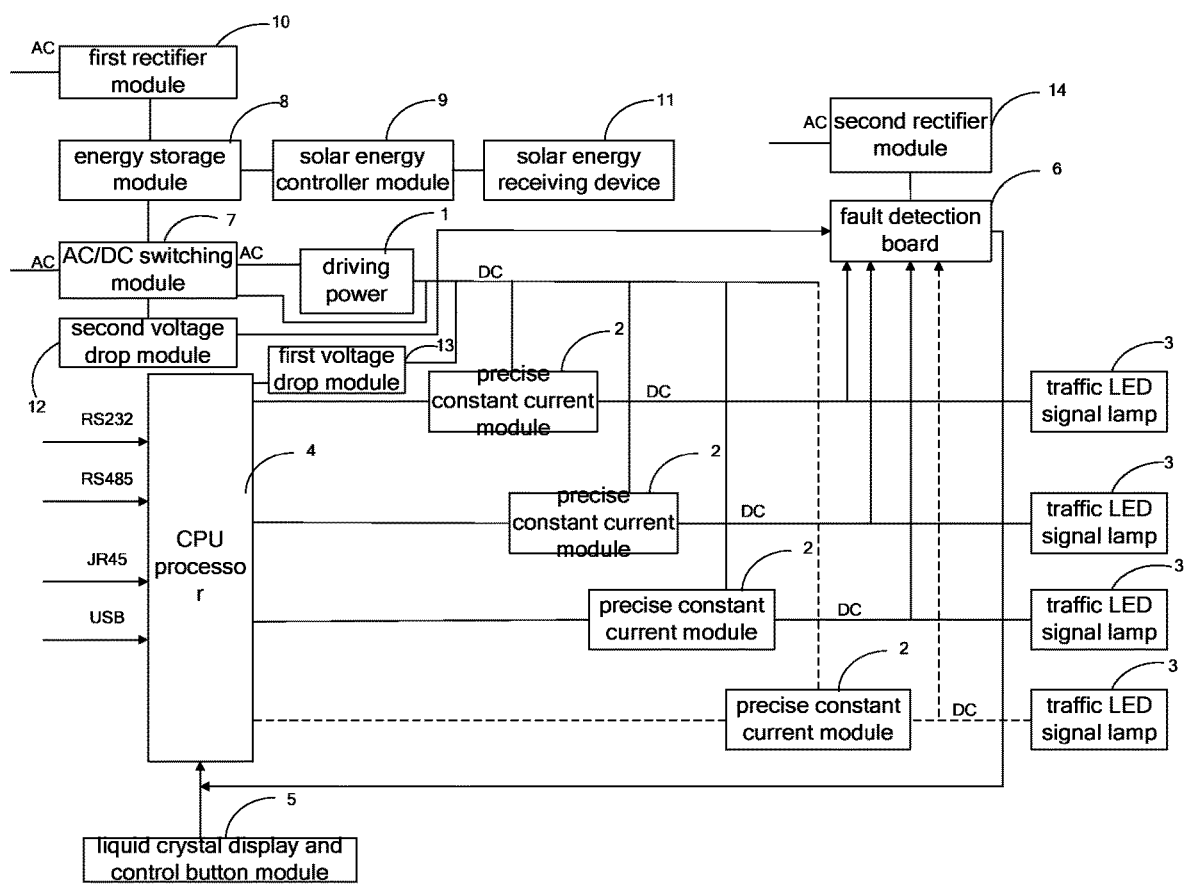
FIG. 2 is another structural diagram of the intelligent control circuit for the traffic LED signal lamp provided by an embodiment of the present application.

As an embodiment of the present application, as shown in FIG. 2, the intelligent control circuit for the traffic LED signal lamp further comprises:

An AC/DC switching module 7, which is in connection with the driving module 1 and configured to: receive a solar electric source and determine whether or not the solar electric source satisfies a preset condition, and convert the solar electric source into the multiple direct currents or alternatively directly connect to the utility electric alternating current according to the preset condition.

When the preset condition is a preset voltage, it is determined by the AC/DC switching module 7 whether or not the voltage of the solar electric source is greater than the preset voltage, if it is determined by the AC/DC switching module that the voltage of the solar electric source is greater than the preset voltage, then the utility electric alternating current is switched to the solar electric source and output the multiple direct currents according to the solar electric source; and if it is determined by the AC/DC switching module that the voltage of the solar electric source is no greater than the preset voltage, then the solar electric source is switched to the utility electric alternating current.

At the same time the AC/DC switching module 7 is in connection with the driving power 1, the AC/DC switching module 7 may also receive the solar electric source via the solar electric source supplying device.

By adopting the AC/DC switching module 7 to determine whether or not the solar electric source satisfies the preset condition and to switch between the solar electric source and the utility electric alternating current according to the determination result, it is realized the power supply to the intelligent traffic LED signal lamp according to the solar energy state.

As an embodiment of the present application, as shown in FIG. 2, the intelligent control circuit for the traffic LED signal lamp further comprises:

an energy storage module 8, in connection with the AC/DC switching module 7, and configured to be charged by a solar charging power supply or a first rectification power supply and output the solar electric source.

When the solar charging power supply is greater than a preset charging power supply, the energy storage module 8 is charged by the solar charging power supply; and when the solar charging power supply is no greater than the preset charging power supply, the energy storage module 8 is charged by the first rectification power supply.

The energy storage module 8 is used for emergency operation in the event of a fault state and power failure of the utility electric power to avoid traffic chaos. At present, the conventional traffic signal controller is unable to realize such emergency operation.

As an embodiment of the present application, as shown in FIG. 2, the intelligent control circuit for the traffic LED signal lamp further comprises:

a solar energy controller module 9, in connection with the energy storage module 8, and configured to generate the solar charging power supply according to an original solar electric source.

As an embodiment of the present application, as shown in FIG. 2, the intelligent control circuit for the traffic LED signal lamp further comprises:

a first rectifier module 10, in connection with the energy storage module 8, and configured to generate the first rectification power supply according to the utility electric alternating current.

As an embodiment of the present application, as shown in FIG. 2, the intelligent control circuit for the traffic LED signal lamp further comprises:

a solar energy receiving device 11, in connection with the solar energy controller module 8, and configured to convert a received solar energy into the original solar electric source.

The solar energy receiving device 11 may be a solar energy plate, or a tethered ball.

As an embodiment of the present application, as shown in FIG. 2, the intelligent control circuit for the traffic LED signal lamp further comprises:

a second voltage drop module a second voltage drop power.

a second voltage drop module 12, in connection with the AC/DC switching module 7, and configured to generate a second voltage drop power according to the direct current output by the AC/DC switching module 7;

a first voltage drop module 13, in connection with the driving power 1, and configured to generate a first voltage drop power according to the direct current output by the driving power 1;

a second rectifier module 14, in connection with the fault detection board 6, and configured to generate a second rectification power according to the utility electric alternating current;

the CPU processor 4 is in connection with the first voltage drop module 13, and the CPU processor 4 is supplied with power by the first voltage drop power; and the fault detection board 6 is in connection with the second voltage drop module 12, and the fault detection board 6 is supplied with power by the second voltage drop power or the second rectification power.

As an embodiment of the present application, the intelligent control circuit for the traffic LED signal lamp further comprises:

an RS232 interface, an RS485 interface, a JR45 interface, and a USB interface respectively in connection with the CPU processor 4.

The purpose of setting the RS232 interface, the RS485 interface, and the JR45 interface is to realize networking, intelligence, and remote control; and the purpose of setting the USB interface is to debug, upgrade, and control.

As an embodiment of the present application, the intelligent control circuit for the traffic LED signal lamp further comprises:

a liquid crystal display and control button module 5 connected to the CPU processor 4, respectively. By setting the liquid crystal display and control button module 5, the information exchange between the intelligent control circuit for the traffic LED signal lamp and human is realized.

As an embodiment of the present application, an input alternating current of the driving power 1 may be 80-305 V, and the output direct current of the driving power 1 is no higher than 60 V.

In this embodiment of the present application, the short-circuit protection is performed on each of the outputs of the traffic LED signal controllers, thereby eradicating the problem of short-circuit of the high voltage output of a traffic signal controller. The most commonly vulnerable components in the traffic signal controller is generally outputting silicon controlled rectifier driving switch, which is generally caused by malfunctions of silicon controlled rectifier components, high voltage cable, and light source driver, and particularly in thunderstorm weather environment, the high voltage short circuit failure rate is very high. Short-circuit protection is performed on each of the outputs of the traffic LED signal controllers, such that it can be ensured that even short-circuit occurs at the output terminal, the traffic LED signal controller and the LED signal lamps are protected from being damaged, and therefore the traffic signal lamps are ensured to work normally in harsh environments.

Figure 3:
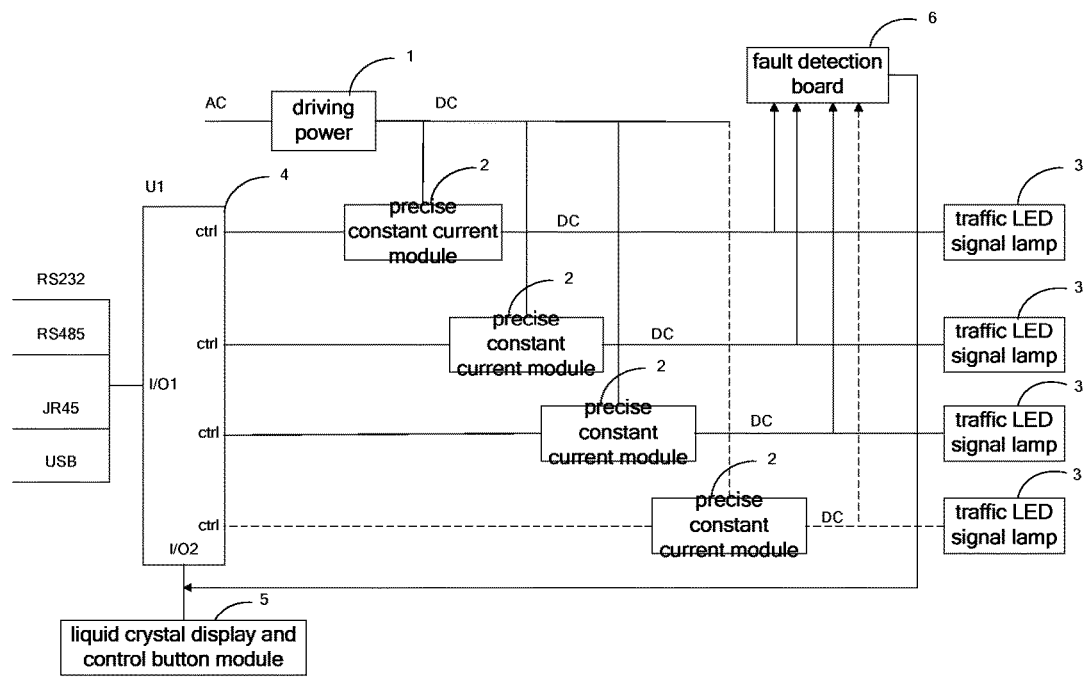
FIG. 3 is a specific structural diagram of the intelligent control circuit for the traffic LED signal lamp provided by an embodiment of the present application.

FIG. 3 shows a specific structure of the intelligent control circuit for the traffic LED signal lamp provided by an embodiment of the present application. For facilitating the description, only those parts related to this embodiment of the present application are shown.

As an embodiment of the present application, the CPU processor 4 adopts a CPU chip U1, a signal terminal I/O1 of the CPU chip U1 is respectively in connection with the RS232 interface, the RS485 interface, the JR45 interface, and the USB interface, a display controlling signal terminal I/O2 of the CPU chip U1 is respectively in connection with the liquid crystal display and control button module 5 and the fault detection board 6, and multiple control terminals ctrl of the CPU chip U1 are respectively in connection with the multiple precise constant current module 2.

An embodiment of the present application further provides an intelligent controller for a traffic LED signal lamp, and the intelligent controller for the traffic LED signal lamp comprises the intelligent control circuit for the traffic LED signal lamp.

In embodiments of the present application, the intelligent control circuit for the traffic LED signal lamp comprises, in series connection, the driving power, the multiple precise constant current modules, and the multiple traffic LED signal lamps. Each path of the precise constant current module outputs a low voltage direct current to directly drive the traffic LED signal lamp, rather than adopting the conventional high voltage driving mode by the bidirectional silicon controlled rectifier, such that problems of "green conflict" caused by the breakdown resulted short circuit and open circuit in the high voltage driving of the bidirectional silicon controlled rectifier are eliminated. In addition, the traffic LED signal lamp is no longer provided therein with the high voltage AC/DC driving power, such that the problems of transient high voltage impulsion at frequency switching and open circuit, short circuit, heat, and vulnerability of the AC/DC driving power are avoided. The lamp body can work normally even when being penetrated with water, not only are the work reliability, accuracy, safety, and energy saving performance of the traffic LED single lamp improved, but also the service life of the traffic LED signal lamp and the performance of the backup power supply are greatly improved. The intelligent control circuit for the traffic LED signal lamp can also be supplied or charged with power by the solar energy or the utility electric alternating current, and the fault detection board has independent power supply and independent operation characteristics. When the intelligent control circuit for the traffic LED signal lamp has a serious fault and a power outage, or the CPU processor is powered off, an independent "yellow flickering" process is triggered and the alarm and fault information are transmitted.

The above is only the preferred embodiment of the present application, and is not intended to limit the present application. Any modifications, equivalent substitutions, and improvements made within the spirit and principles of the present application should be included in the scope of protection of the present application.

What is claimed is:

1. An intelligent control circuit for a traffic LED signal lamps, comprising:
    a driving power, configured to convert a utility electric alternating current into multiple direct currents for output;
    multiple precise constant current modules, in one-to-one correspondence to the multiple direct currents, respectively, and configured to perform precise constant current processing on each of the multiple direct currents for output;
    the multiple precise constant current modules having output terminals for respective connection with the traffic LED signal lamps;
    a CPU processor, in connection with the multiple precise constant current modules, respectively, and configured to output control signals to the multiple precise constant current modules; and
    an RS232 interface, an RS485 interface, a JR45 interface, and a USB interface respectively in connection with the CPU processor,
    wherein an input alternating current of the driving power is 80-305 V, and an output direct current of the driving power is no higher than 60 V.

2. The intelligent control circuit of claim 1, further comprising:
    a fault detection board, respectively in connection with the CPU processor and the output terminals of the multiple precise constant current modules, configured to monitor a traffic LED signal light system and to avoid abnormal display of the traffic LED signal light system.

3. The intelligent control circuit of claim 1, further comprising:
    an AC/DC switch, in connection with the driving power, and configured to:
    receive a solar electric source and determine whether the solar electric source satisfies a condition, and convert the solar electric source into the multiple direct currents or alternatively directly connect to the utility electric alternating current according to the condition.

4. The intelligent control circuit of claim 3, further comprising:
    an energy storage, in connection with the AC/DC switch, configured to be charged by a solar charging power supply or a rectification power supply, and output the solar electric source.

5. The intelligent control circuit of claim 4, further comprising:
    a solar energy controller, in connection with the energy storage, and configured to generate the solar charging power supply based on a solar electric source.

6. The intelligent control circuit of claim 4, further comprising:
    a rectifier, in connection with the energy storage, and configured to generate the rectification power supply based on the utility electric alternating current.

7. The intelligent control circuit of claim 4, further comprising:

a solar energy receiver, in connection with a solar energy controller, and configured to convert a received solar energy into an original solar electric source.

8. The intelligent control circuit of claim 4, further comprising:
a first voltage drop power generator, in connection with the driving power, and configured to generate a first voltage drop power according to a direct current output by the driving power;
a second voltage drop power generator, in connection with the AC/DC switch, and configured to generate a second voltage drop power according to a direct current output by the AC/DC switch;
a rectifier, in connection with a fault detection board, and configured to generate another rectification power supply according to the utility electric alternating current; and
a CPU processor, in connection with the first voltage drop power generator, the CPU processor being supplied with power by the first voltage drop power,
wherein the fault detection board is in connection with the second voltage drop power generator, and the fault detection board is supplied with power by the second voltage drop power or the other rectification power supply.

9. The intelligent control circuit of claim 1, further comprising:
a liquid crystal display and control button module connected to the CPU processor.

10. The intelligent control circuit of claim 9, wherein the CPU processor comprises a CPU chip, a signal terminal of the CPU chip being respectively in connection with the RS232 interface, the RS485 interface, the JR45 interface, and the USB interface, a display controlling signal terminal of the CPU chip being respectively in connection with the liquid crystal display and control button module and a fault detection board, and multiple control terminals of the CPU chip being respectively in connection with the multiple precise constant current modules.

11. An intelligent controller, comprising the intelligent control circuit of claim 1.

12. An intelligent control circuit for traffic LED signal lamps, comprising:
a driving power, configured to convert a utility electric alternating current into multiple direct currents for output;
multiple precise constant current modules, in one-to-one correspondence to the multiple direct currents, respectively, and configured to perform precise constant current processing on each of the multiple direct currents for output;
the multiple precise constant current modules having output terminals for respective connection to the traffic LED signal lamps;
an AC/DC switch, in connection with the driving power, and configured to receive a solar electric source and determine whether the solar electric source satisfies a preset condition, and convert the solar electric source into the multiple direct currents or alternatively directly connect to the utility electric alternating current according to the preset condition;
an energy storage, in connection with the AC/DC switch, configured to be charged by a solar charging power supply or a first rectification power supply, and output the solar electric source;

a first voltage drop generator, in connection with the driving power, and configured to generate a first voltage drop power according to a direct current output by the driving power;
a second voltage drop generator, in connection with the AC/DC switch, and configured to generate a second voltage drop power according to a direct current output by the AC/DC switch;
a rectifier, in connection with a fault detection board, and configured to generate a second rectification power supply according to the utility electric alternating current; and
a CPU processor, in connection with the first voltage drop generator, the CPU processor being supplied with power by the first voltage drop power;
wherein the fault detection board is in connection with the second voltage drop generator, and the fault detection board is supplied with power by the second voltage drop generator or the second rectification power supply.

13. The intelligent control circuit of claim 12, wherein the CPU processor is in connection with the multiple precise constant current modules, respectively and configured to output control signals to the multiple precise constant current modules.

14. The intelligent control circuit of claim 12, wherein the fault detection board is respectively in connection with the CPU processor and the output terminals of the multiple precise constant current modules, and configured to monitor a traffic LED signal light system and to avoid abnormal display of the traffic LED signal light system.

15. The intelligent control circuit of claim 12, further comprising:
a solar energy controller, in connection with the energy storage, and configured to generate the solar charging power supply according to an original solar electric source.

16. The intelligent control circuit of claim 12, further comprising:
another rectifier, in connection with the energy storage, and configured to generate the first rectification power supply according to the utility electric alternating current.

17. The intelligent control circuit of claim 12, further comprising:
a solar energy receiver, in connection with the solar energy controller, and configured to convert a received solar energy into an original solar electric source.

18. The intelligent control circuit of claim 13, further comprising:
an RS232 interface, an RS485 interface, a JR45 interface, and a USB interface respectively in connection with the CPU processor.

19. The intelligent control circuit of claim 18, further comprising:
a liquid crystal display and control button module connected to the CPU processor.

20. The intelligent control circuit of claim 19, wherein the CPU processor comprises a CPU chip, a signal terminal of the CPU chip being respectively in connection with the RS232 interface, the RS485 interface, the JR45 interface, and the USB interface, a display controlling signal terminal of the CPU chip being respectively in connection with the liquid crystal display and control button module and a fault detection board, and multiple control terminals of the CPU chip being respectively in connection with the multiple precise constant current modules.

\* \* \* \* \*